United States Patent
Gupta et al.

(10) Patent No.: US 11,716,311 B2
(45) Date of Patent: Aug. 1, 2023

(54) INFERRING FIREWALL RULES FROM NETWORK TRAFFIC

(71) Applicant: Google LLC, Mountain View, CA (US)

(72) Inventors: Vishal Gupta, Milpitas, CA (US); Vikas Aggarwal, Brisbane, CA (US); Kan Cai, Sunnyvale, CA (US); Gargi Adhav, San Jose, CA (US); Xiaoyu Zhang, San Jose, CA (US)

(73) Assignee: Google LLC, Mountain View, CA (US)

( * ) Notice: Subject to any disclaimer, the term of this patent is extended or adjusted under 35 U.S.C. 154(b) by 157 days.

(21) Appl. No.: 17/121,082

(22) Filed: Dec. 14, 2020

(65) Prior Publication Data

US 2022/0166756 A1 May 26, 2022

Related U.S. Application Data

(60) Provisional application No. 63/117,810, filed on Nov. 24, 2020.

(51) Int. Cl.
| | | |
|---|---|---|
| H04L 9/40 | (2022.01) | |
| H04L 41/16 | (2022.01) | |
| H04L 47/125 | (2022.01) | |
| H04L 47/25 | (2022.01) | |
| H04L 47/41 | (2022.01) | |

(52) U.S. Cl.
CPC .......... *H04L 63/0263* (2013.01); *H04L 41/16* (2013.01); *H04L 47/125* (2013.01); *H04L 47/25* (2013.01); *H04L 47/41* (2013.01); *H04L 63/20* (2013.01)

(58) Field of Classification Search
CPC ....... H04L 41/16; H04L 47/125; H04L 47/25; H04L 47/41; H04L 63/0263; H04L 63/20
See application file for complete search history.

(56) References Cited

U.S. PATENT DOCUMENTS

| | | | | |
|---|---|---|---|---|
| 7,610,621 | B2* | 10/2009 | Turley | H04L 63/0263 726/11 |
| 9,843,560 | B2* | 12/2017 | Hwang | H04L 63/0263 |
| 10,645,121 | B1* | 5/2020 | Nimmagadda | H04L 63/0263 |
| 2014/0068701 | A1* | 3/2014 | Burchfield | H04L 63/02 726/1 |
| 2014/0282854 | A1* | 9/2014 | Clark | H04L 63/20 726/1 |

(Continued)

OTHER PUBLICATIONS

Alan Jeffery and Taghrid Samak. "Model Checking Firewall Policy Configurations", 2009 IEEE International Symposium on Policy for Distributed Systems and Networks, 8 pages. (Year: 2009).*

(Continued)

*Primary Examiner* — George C Neurauter, Jr.
(74) *Attorney, Agent, or Firm* — Lerner David LLP

(57) ABSTRACT

Aspects of the disclosed technology comprise generating firewall rules based on traffic, outputting the generated firewall rules to an output file, and using the output file to set firewall rules in a network. The firewall rules may be generated without a priori knowledge of the network; alternatively no firewall rules are required. Generated rules may be tuned for user preferences to adjust for the number of generated firewall rules, and their over or under inclusiveness to non-historic traffic data.

20 Claims, 10 Drawing Sheets

(56) References Cited

U.S. PATENT DOCUMENTS

| | | | | |
|---|---|---|---|---|
| 2015/0033285 | A1* | 1/2015 | Gao | G06F 21/552 |
| | | | | 726/1 |
| 2017/0078329 | A1* | 3/2017 | Hwang | H04L 63/0263 |
| 2018/0375831 | A1* | 12/2018 | Kliger | H04L 63/0263 |
| 2019/0190888 | A1* | 6/2019 | Madden | G06F 21/6281 |
| 2020/0220845 | A1* | 7/2020 | Cook | G06F 9/5061 |
| 2020/0314066 | A1* | 10/2020 | Cruz Farmer | H04L 63/0245 |
| 2020/0329011 | A1* | 10/2020 | Cai | H04L 63/0263 |
| 2020/0336457 | A1* | 10/2020 | Sharma | H04L 63/02 |
| 2021/0014274 | A1* | 1/2021 | Monni | H04L 63/20 |
| 2021/0026677 | A1* | 1/2021 | Krishna | H04L 43/026 |
| 2021/0234816 | A1* | 7/2021 | Zong | G10L 15/22 |
| 2021/0320903 | A1* | 10/2021 | Kalaycilar | H04L 43/06 |
| 2022/0006783 | A1* | 1/2022 | Hassanzadeh | H04L 63/0263 |
| 2022/0051111 | A1* | 2/2022 | Hadar | G06F 21/572 |

OTHER PUBLICATIONS

International Search Report and Written Opinion for International Application No. PCT/US2021/060802 dated Feb. 25, 2022. 14 pages.

Liao et al. Managing Networks through Context: Graph Visualization and Exploration. Nov. 15, 2010. Computer Networks, Elsevier, Amsterdam, NL, vol. 54, No. 16, pp. 2809-2824, DOI: 10.1016/J.COMNET.2010.07.015.

Ucar et al. The Analysis of Firewall Policy Through Machine Learning and Data Mining. May 17, 217. Wireless Personal Communications, Springer, Dororecht, NL, vol. 96, No. 2, pp. 2891-2909, DOI: 10.I007/S11277-017-4330-0.

\* cited by examiner

200

INFERRING FIREWALL RULES FROM NETWORK TRAFFIC

CROSS-REFERENCE TO RELATED APPLICATIONS

The present application claims the benefit of the filing date of U.S. Provisional Patent Application No. 63/117,810 filed Nov. 24, 2020, the disclosure of which is hereby incorporated herein by reference.

BACKGROUND

Modern computing environments typically include varied computing devices that communicate with each other over a network to share information. Such communications are typically performed in the context of rules or permissions that prescribe security features in the form of firewalls, as well as other features such as packet size, etc. Such computing environments may include enterprise networks, such as for example, between different offices of a corporation) as well communications involving cloud computing resources. Modern cloud environments can contain a very large number of virtual machines (VMs). Cloud systems or cloud environments are maintained by a cloud operator or owner. Often, a portion of the cloud environment or the virtual machines belong to different users or user groups. Each virtual machine on the cloud environment can deploy various applications specific to the user or user group to which it belongs.

Users of a cloud environment may desire to configure a firewall for individual machines or groups of machines within the cloud. A firewall is a security program, device, or module, which monitors incoming and outgoing network traffic. The firewall can be configured to permit or block certain data packets based on a set of rules. The firewall thus allows for incoming or outgoing data packets to be blocked or permitted through. A firewall can thus block certain undesirable traffic such as viruses, executable code, or responses to requests from fraudulent or unauthenticated sources. Configuration of a firewall is a complex task for network administrators, which requires manual monitoring, configuration, and initialization of hundreds or thousands of individual rules to manage a firewall. The interplay between the multiple rules creates unexpected complexity in managing, diagnosing, and using firewalls effectively.

In the context of a cloud environment, a user may wish to migrate network operations from their enterprise network to a cloud environment or migrate those operations between different cloud environments supported by different providers or within a given cloud computing environment. In such examples, existing rules may not translate properly to the new cloud environment. Further, the complexity of the number of rules, which may have been created ad-hoc, may not translate into the expected behavior of the firewall. In addition, older or managed rules may have unexpected effects in the new environment and given the ad hoc nature in which they are typically created may pose security risks or result in inefficient operations.

New users of a cloud environment may desire to create or establish a set of firewalls rules for a new virtual machine.

SUMMARY

Aspects of the disclosed technology include methods, systems, and apparatuses to generate firewall rules based on historic traffic information within a network and output the firewall rules, such as within an output file, and use the output file to set, establish, or instantiate firewall rules within a network.

Aspects of the disclosed technology include generating firewall rules by receiving data traffic flow information associated with computing devices connected over a network; generating, from the received data traffic flow information, a network graph with nodes and edges; grouping nodes of the network graph to generate a new graph; generating, from the new graph, a set of firewall rules; and outputting the set of firewall rules as an output file, as data, or send those rules to a firewall.

Aspects of the disclosed technology include generating firewall rules by receiving data traffic flow information associated with computing devices connected over a network; generating, from the received data traffic flow information, a network graph with nodes and edges; grouping nodes of the network graph to generate a new graph; generating, from the new graph, a set of firewall rules; and outputting the set of firewall rules as an output file, as data, or send those rules to a firewall.

Grouping can occur through a machine learning algorithm. Network equipment associated with another network, which corresponds to the network graph, can be automatically provisioned to communicate or contain firewall rules based on the set of firewall rules outputted as an output file or other format. Grouping can occur without a priori knowledge of the traffic data. Nodes of the graph can be grouped into groups, and each group is a node of a new graph. Grouping can be based on iterative grouping can occur without a priori knowledge of the traffic data. A parameter associated with a grouping algorithm to minimize, or otherwise change the number of type of firewall rules generated can be varied.

The set of firewall rules can be validated based on historical traffic data and a set of original firewall rules. The set of firewall rules can be validated based on the synthetic traffic data and a set of original firewall rules. A validation report summarizing metrics related to the generated firewall rules can be generated.

The set of firewall rules can automatically, or responsive to a user input, be implemented after validation or generation The set of firewall rules can be tuned or periodically updated and implemented within a network environment. The set of firewall rules can be loaded into a firewall component and the firewall component can be used to control network traffic through the firewall component or the network.

A machine learning method used for grouping can be one of: (i) community detection algorithm, (ii) a centrality measure based algorithm, (iii) a visual machine learning method, (iv) a wherein clique-based methods, (v) a pagerank algorithm, (vi) an generative adversarial networks, (vii) a machine learning classification algorithm.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

Figure 1:
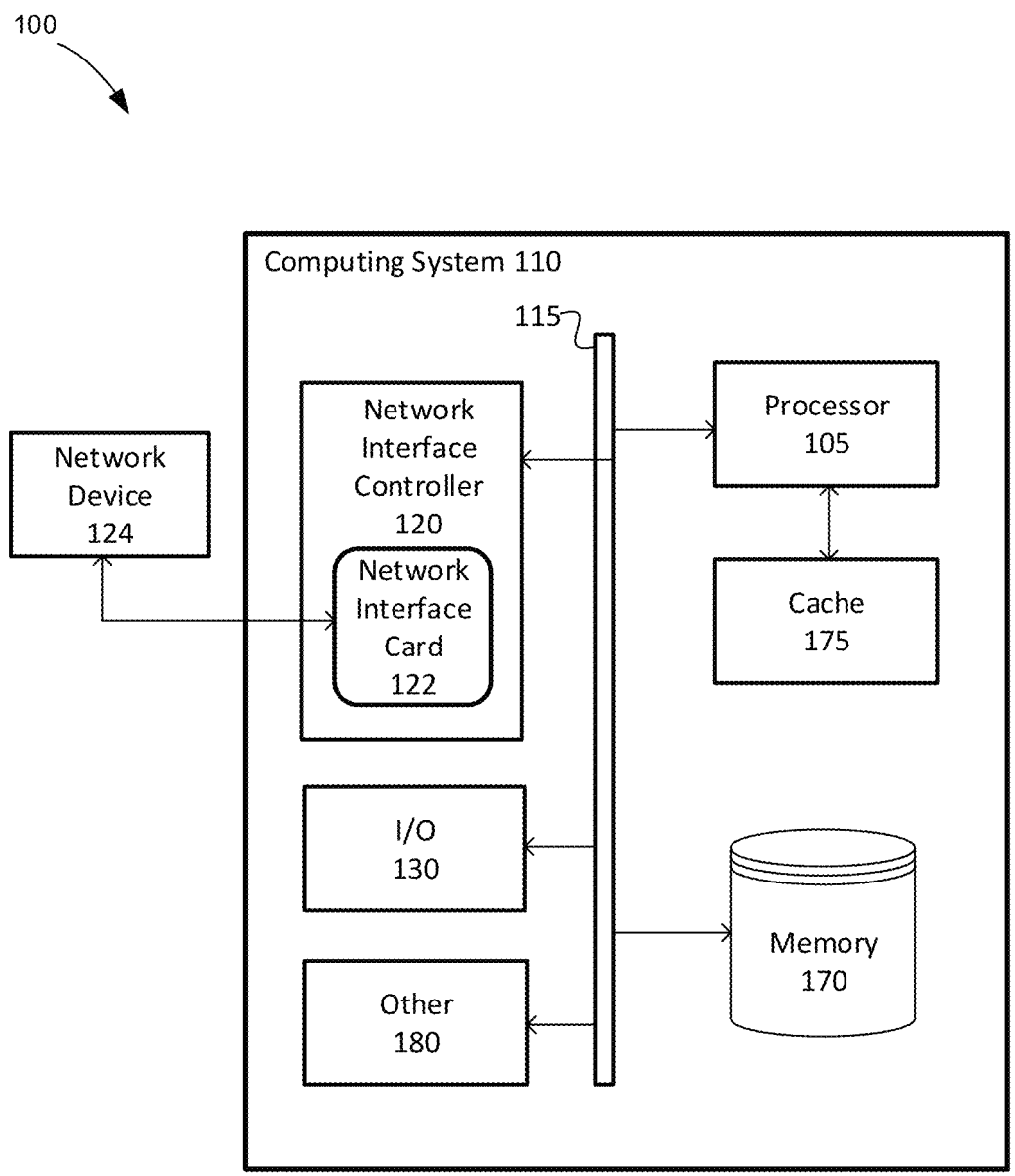
FIG. 1 illustrates an example computing system according to aspects of the disclosure.

As used in this disclosure, a point, vertex, and node are used interchangeably in the context of graph theory. Traffic data is information related to the ingress or egress of information from a virtual machine or computing device to another virtual machine or computing device, which can be either within a particular cloud environment or external to that cloud environment.

Historical traffic data, both internal within a cloud, and external to the cloud, can be represented as a mathematical graph. Each object, such as a virtual machine, router, device, computer, can be represented as a node, and a connection between two objects can be represented as an edge between those nodes. In some examples, for a network of "n" objects, $n*(n-1)$ directional edges, which represent a direction of data flow, can exist within a graph and $n*(n-1)/2$ non-directional edges can exist.

Graph analysis algorithms can be used on representations of a network to group vertices within the network within a group or otherwise analyze graphs. In some examples, each group can be c. Each group of a first graph can be used to transform or create new nodes of a new graph. Edges within a prior graph can be combined into a single edge. This new graph can be representative of a new set of simplified firewall rules. The new set of firewall rules will typically be computationally more efficient, more easily understood by a human user, such as a network administrator, and more intuitively represented in a graphical format. The new set of firewall rules may be compiled into a file, which is then used to provision the network resulting from the migration.

Graph analysis algorithms can be based on various parameters. In some examples, the analysis or grouping can be more "aggressive" leading to a smaller number of groups, and a smaller number of edges. In other examples, less aggressive grouping can lead to more groups, with a larger number of edges, and more generated firewall rules. As the set of groups and generated firewall rules is not "unique," the generated firewall rules can be optimized based on user preferences.

Both the generated rules and parameters related to the grouping or graph analysis algorithms can be respectively validated and tuned based on both historic traffic data and synthetic traffic. Synthetic traffic can test connections which were not part of the historic traffic data. Further, behavior of yet unknown or non-historic traffic patterns can be allowed or rejected based on the generated rules. In some examples, the overinclusiveness or underinclusiveness of the generated rules can be tested based on the synthetic data and adjusted accordingly. In other examples, the aforementioned process can be iteratively performed, using supervised or unsupervised machine learning, to generate multiple sets of firewall rules.

In some examples, the synthetic traffic data can be used to test generated firewall rules against traffic flow which was not included in historical information used to generate the firewall rules and to validate the firewall rules against unseen traffic data or unknown historic traffic data.

Aspects of the disclosed technology allow for a generated set of firewall rules which are (1) correct in that they match with historical traffic logs, (2) secure, in that they are more general than the non-generated set of firewall rules (more general in that they are more applicable to yet unknown types of traffic, which are not or have not been part of the historic logs, as all unknown types of data can be denied), or (3) simple, in that the number of generated rules can be fewer and more condensed than the conventional set of firewall rules and more understandable by a user or network administrator. Firewall rules that are generated using the techniques disclosed herein typically increase the security over firewall rules created by an administrator or other conventional techniques, because generated traffic rules can be such that traffic not encountered in the historic traffic log is generally rejected. Further, aspects of the disclosed technology allow for periodic updates, and automatic tuning of firewall rules as traffic patterns to a network or within a network change over time. Thus, the generated firewall rules can be periodically updated or automatically implemented within a network environment.

Aspects of the disclosed technology can be used in connection with communication amongst and between virtual machines related to or dedicated to various "internet of things" devices, such as routers, smart thermostats, or other devices which communicate with one another and contain private or sensitive information.

Aspects of the disclosed technology allow for validation of the firewall rules using validation output or a confusion matrix, which can be used to "tune" or affect the generated rules.

Aspects of the disclosed technology allow for the use of grouping and the generation of firewall rules without knowledge of the type of network data used to generate the firewall rules. Thus, the disclosed technology allows for a lack of a priori knowledge related to the historic network data being used and the methods can be agnostic to the type of network data which is being used.

Example Systems

The following figures illustrate aspects of the disclosed technology. A person of skill in the art will understand that the various disclosed components can be coupled electronically by one or more of the disclosed electronics, processors, and computing devices to perform the methods and techniques disclosed herein. For simplicity and clarity, not every electronic or data link is illustrated.

In some examples, existing cloud users can use historic traffic logs to achieve an optimized or new set of firewall rules. In other examples, a user migrating to a new cloud environment can import or record traffic data in the new environment to generate a new set of firewall rules.

FIG. 1 is a block diagram 100 illustrating an example computer system 110 with which aspects of this disclosure, including the machine learning systems and techniques described herein, and any components thereof, can be implemented. In certain aspects, the computer system 110 may be implemented using hardware or a combination of software and hardware, either in a dedicated server, or integrated into another entity, or distributed across multiple entities. In some examples, example computing system 110 can be a user computing system or device. In other examples, cloud 201, as for example shown in FIG. 2, can consist of one or more example computer systems, similar to computing system 110, coupled or linked via software and hardware components to operate collectively as a cloud.

In broad overview, the computing system 110 includes at least one processor 150 for performing actions in accordance with instructions and one or more memory devices 170 or 175 for storing instructions and data. The illustrated example computing system 110 includes one or more processors 150 in communication, via a bus 115, with at least one network interface driver controller 120 with one or more network interface cards 122 connecting to one or more network devices 124, memory 170, and any other devices 180, e.g., an I/O interface. The network interface card 122 may have one or more network interface driver ports to communicate with the connected devices or components. Generally, a processor 150 executes instructions received from memory. The processor 150 illustrated incorporates, or is directly connected to, cache memory 175.

In more detail, the processor 150 may be any logic circuitry that processes instructions, e.g., instructions fetched from the memory 170 or cache 175. In many embodiments, the processor 150 is a microprocessor unit or special purpose processor. The computing device 110 may be based on any processor, or set of processors, capable of operating as described herein. The processor 150 may be a single core or multi-core processor. The processor 150 may be multiple processors. In some implementations, the processor 150 can be configured to run multi-threaded operations. In some implementations, the processor 150 may host one or more virtual machines or containers, along with a hypervisor or container manager for managing the operation of the virtual machines or containers. In such implementations, the methods shown and described in FIGS. 4-6 can be implemented within the virtualized or containerized environments provided on the processor 150.

The memory 170 may be any device suitable for storing computer readable data. The memory 170 may be a device with fixed storage or a device for reading removable storage media. Examples include all forms of non-volatile memory, media and memory devices, semiconductor memory devices, such as EPROM, EEPROM, SDRAM, and flash memory devices, magnetic disks, magneto optical disks, and optical discs, such as CD ROM, DVD-ROM, and Blu-ray® discs. A computing system 110 may have any number of memory devices 170. In some implementations, the memory 170 supports virtualized or containerized memory accessible by virtual machine or container execution environments provided by the computing system 110.

The cache memory 175 is generally a form of computer memory placed in close proximity to the processor 150 for fast read times. In some implementations, the cache memory 175 is part of, or on the same chip as, the processor 150. In some implementations, there are multiple levels of cache 175, e.g., L2 and L3 cache layers.

The network interface driver controller 120 manages data exchanges via the network interface driver 122 (also referred to as network interface driver ports). The network interface driver controller 120 handles the physical and data link layers of the OSI model for network communication. In some implementations, some of the network interface driver controller's tasks are handled by the processor 150. In some implementations, the network interface driver controller 120 is part of the processor 150. In some implementations, a computing system 110 has multiple network interface driver controllers 120. The network interface driver ports configured in the network interface card 122 are connection points for physical network links. In some implementations, the network interface controller 120 supports wireless network connections and an interface port associated with the network interface card 122 is a wireless receiver/transmitter. Generally, a computing device 110 exchanges data with other network devices 124 via physical or wireless links that interface with network interface driver ports configured in the network interface card 122. In some implementations, the network interface controller 120 implements a network protocol such as Ethernet.

The other network devices 124 are connected to the computing device 110 via a network interface driver port included in the network interface card 122. The other network devices 124 may be peer computing devices, network devices, or any other computing device with network functionality. For example, a first network device 124 may be a network device such as a hub, a bridge, a switch, or a router, connecting the computing device 110 to a data network such as the Internet or Cloud 201 shown in FIG. 1.

The other devices 180 may include an I/O interface, external serial device ports, and any additional co-processors. For example, a computing system 110 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 100 includes an additional device 180 such as a coprocessor, e.g., a math co-processor can assist the processor 150 with high precision or complex calculations.

Instructions on computing system 110 may control various components and functions of computing system 110. For example, the instructions may be executed to perform any of the methods indicated in this disclosure. In some examples, algorithms can be included as a subset of or otherwise as part of instructions included on computing system 110. Instructions can include algorithms to execute any of the methods or a subset of the methods described within this disclosure.

User interfaces on the computing system 110 may include a screen which allows a user to interact with computing system 110, such as a touch screen or buttons. A display can also be included such as an LCD, LED, mobile phone display, electronic ink, or other display to display information about computing system 110. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for computing system 110 to be updated and information generated by computing system 110 to be shared to other devices. In some examples, communication interface(s) can send information stored in memory to another user device for display, storage or further analysis.

Figure 2:
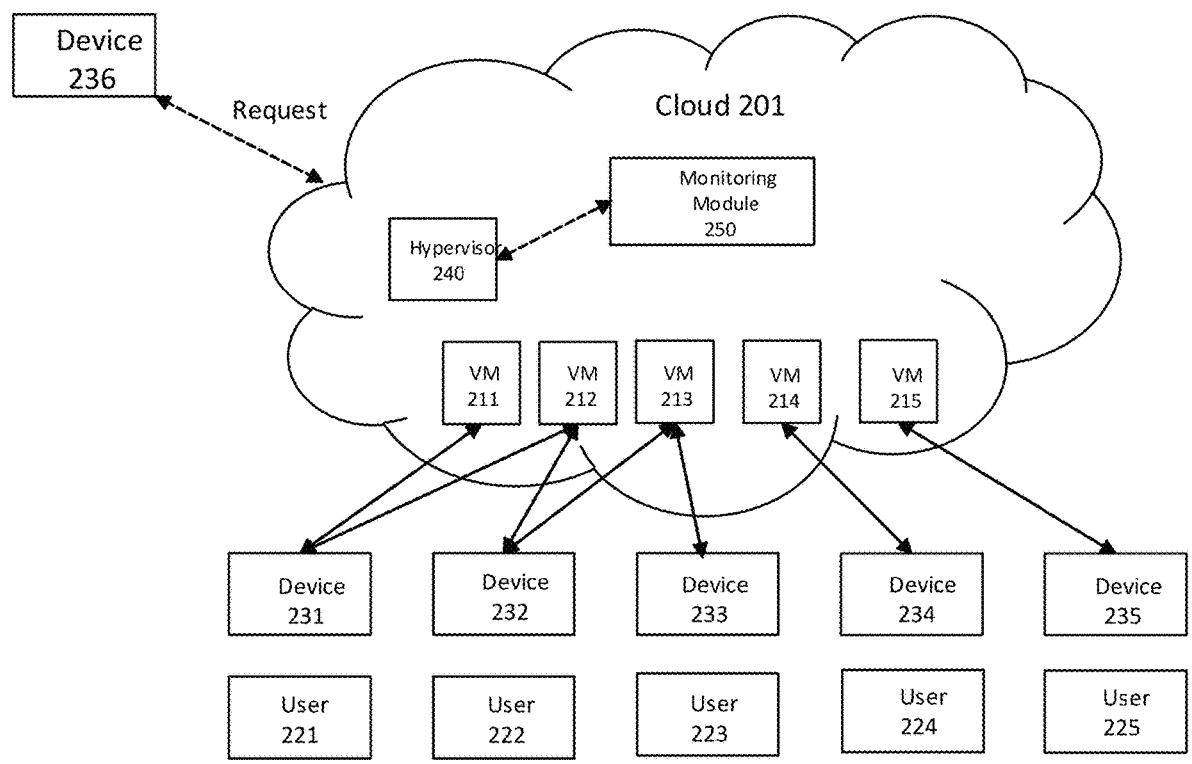
FIG. 2 illustrates a schematic view of a network according to aspects of the disclosure.

FIG. 2 illustrates a schematic view of an example of a network 200 with cloud 201, virtual machines 211-215, devices 231-235 respectively associated with users 221-225. Cloud 201 can contain hardware which can include, for example, networking equipment, like switches, routers, firewalls, load balancers, storage arrays, backup devices, and servers. Cloud 201 can be thought of as an abstraction which connects the servers together, dividing and abstracting resources to make them accessible to users via virtual machines VM. Cloud 201 can contain a firewall module 250, a hypervisor 240, and virtual machines 211-215.

Although cloud 201 is represented as a singular entity, a person of skill in the art should understand that cloud 201 is a conceptualization of distributed hardware and software systems. Cloud 201 can consist of other clouds. In other examples, cloud 201 can be a virtual machine or a virtual cloud which is itself located within another cloud. In some examples, cloud 201 can be distributed or divided across a plurality of physical locations, such as datacenters, which can be interlinked or interconnected. In other examples, portions of cloud 201 can be hosted offsite. For instance, in some examples, computer processing or computational hardware for cloud 201 can be located in one location while storage mediums can be located in other areas.

Cloud 201 can also be configured such that aspects of the cloud environment are controlled. For example, cloud 201 can contain software which responds to user demands or requests, such as increasing or decreasing the size of a virtual machine, the amount of resources dedicated to a virtual machine, or the number of virtual machines available to a given user.

Cloud 201 can contain a number of virtual machines 211-215. Generally, a virtual machine is an emulation of a computer system or computer network. Virtual machines are based on computer architectures and can provide the functionality of a physical computer. An implementation may involve specialized hardware, software, or a combination. Each virtual machine 211-219 can be hosted or run on a cloud. In some examples, a virtual machine can be instantiated responsive to a user request. In some examples, each virtual machine can be a group or network of virtual machines.

Cloud 201 can also contain a hypervisor 240 or multiple hypervisors. A hypervisor is also known as a virtual machine monitor, a VMM, or a virtualizer. A hypervisor is a piece of computer software, firmware, or hardware that can create, run, or monitor virtual machines. In some examples, only certain types of information about the virtual machines in cloud 201 can be accessible to hypervisor 240.

Each virtual machine can be managed by a user 221-225. Each user can access his or her corresponding virtual machine through tools provided by the cloud provider, such as through user devices 231-235. In some examples, this occurs through the use of a web interface, such as web-interface 241, which is typically provided by the cloud provider. In other examples, specialized software installed on a user device can be used to interact with the cloud or a particular virtual machine. User devices 231-235 can be similar to computing system 110, described above with reference to FIG. 1.

User device 236 can be a device which is not controlling or subscribed to the virtual machines of cloud 201, but can access information or resources of the clouds. In some examples, a user device 236 can make a request or attempt to access resources which are hosted on cloud 201. For example, user device 236 may attempt to make a particular request using a web interface which can in turn be routed to a particular virtual machine on cloud 201.

Each virtual machine, or group of virtual machines can be running one or more applications, software, operating system, and store data. In addition, requests from users to the cloud, to one or more virtual machines, or between virtual machines can generate network data or traffic.

Figure 3:
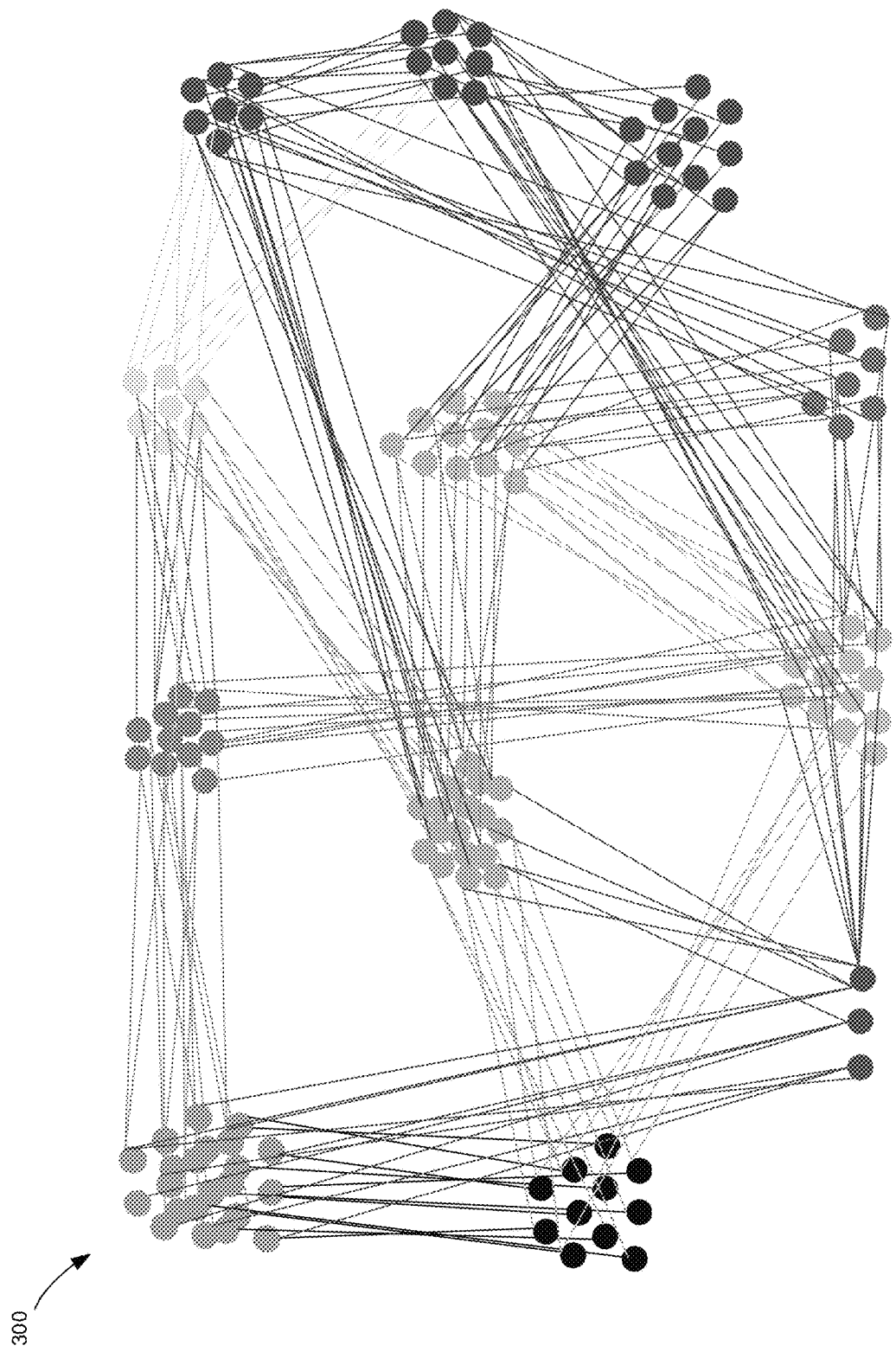
FIG. 3 illustrates an example network graph according to aspects of the disclosure.

FIG. 3 illustrates a graphical representation of allowable connections between virtual machines as graph 300. A graph is generally thought of as a mathematical structure used to illustrate or conceptualize pairwise relationships between objects. A graph can consist of points, also known as nodes. An edge is a connection between two nodes, which indicates a relationship between the nodes. A graph typically has a single edge between any two nodes, while a multigraph may have more than one edge between any two nodes. A person of skill in the art should understand that a graph can refer to various objects in graph theory, including for example, a multigraph. A person of skill in the art should also understand that the equivalent mathematical structures can be used in lieu or in conjunction with graph 300 described herein.

In graph 300, each virtual machine can be represented as a node. An allowable connection between two virtual machines can be represented as an edge or connection between two nodes or vertices. In some examples, graph 300 can be a directed graph, where each edge has an associated direction. In other examples, the edges can be bidirectional. In other examples, graph 300 can be a multigraph. In other examples, graph 300 can be a mixed graph, in which some edges are directed while other edges are undirected.

Additional information can be encoded or represented within graph 300, such as the port of a virtual machine used, or the protocol used. For example, a 5-tuple {vm1, port1, vm2, port2, protocol} results into an edge between virtual machines VM1 & VM2 with ports and protocol as edge metadata. This metadata can be used for grouping as well as for rule generation, as further described herein.

Figure 4A:
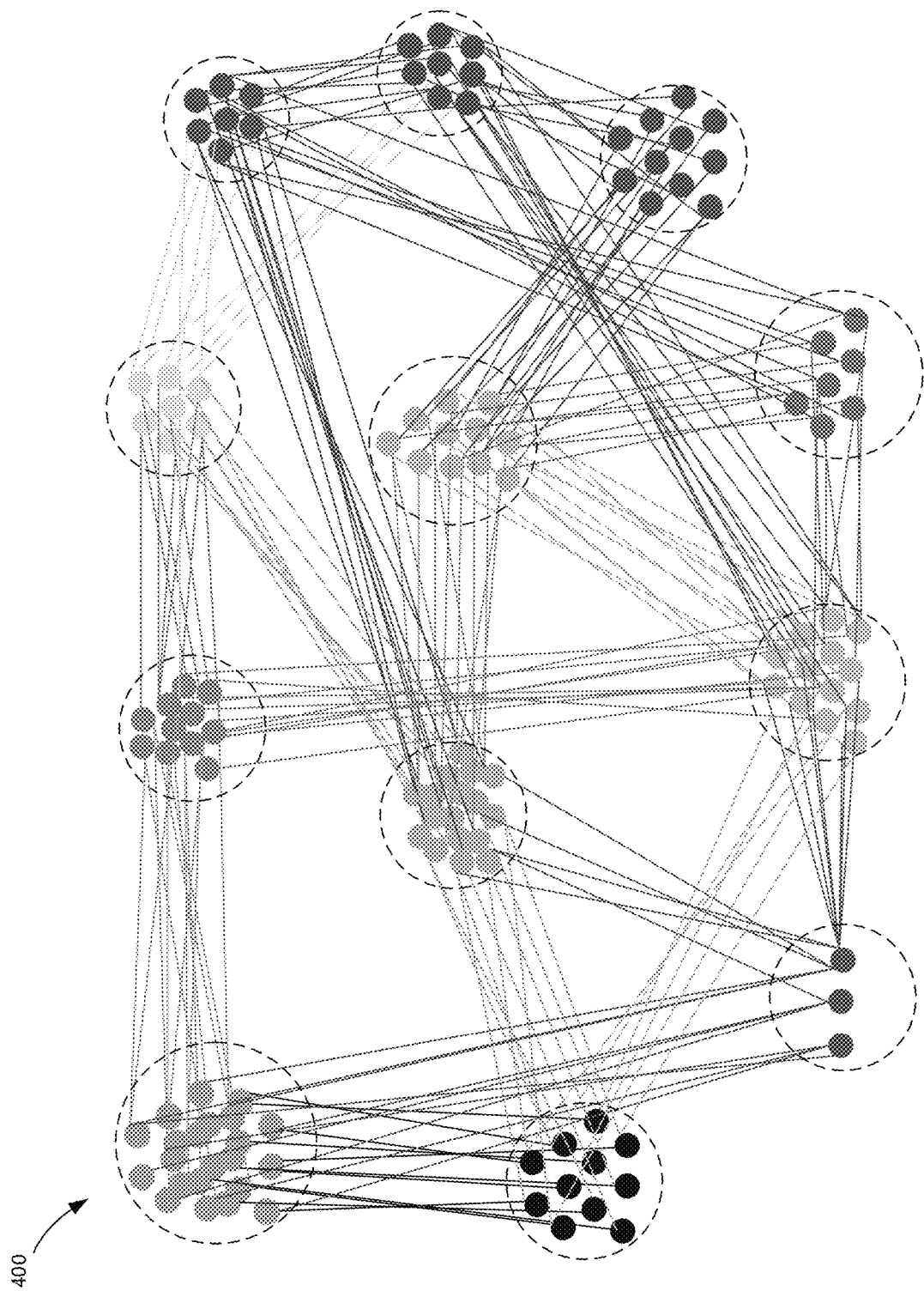
FIG. 4A illustrates an example network graph after graph analysis according to aspects of the disclosure.

FIG. 4A illustrates a graphical representation of allowable connections between virtual machines wherein the virtual machines have been categorized or grouped or bunched together as graph 400. Example methods to generate or classify virtual machines in groups are further described in this disclosure.

Groups of nodes are bounded by a dotted line. In some examples, these groups can be formed through categorization or grouping methods, such as those described in this disclosure. In some examples, spatial grouping algorithms can be used to generate or categorize vertices within graph 400 into groups. Additional example algorithms and methods are described herein.

Figure 4B:
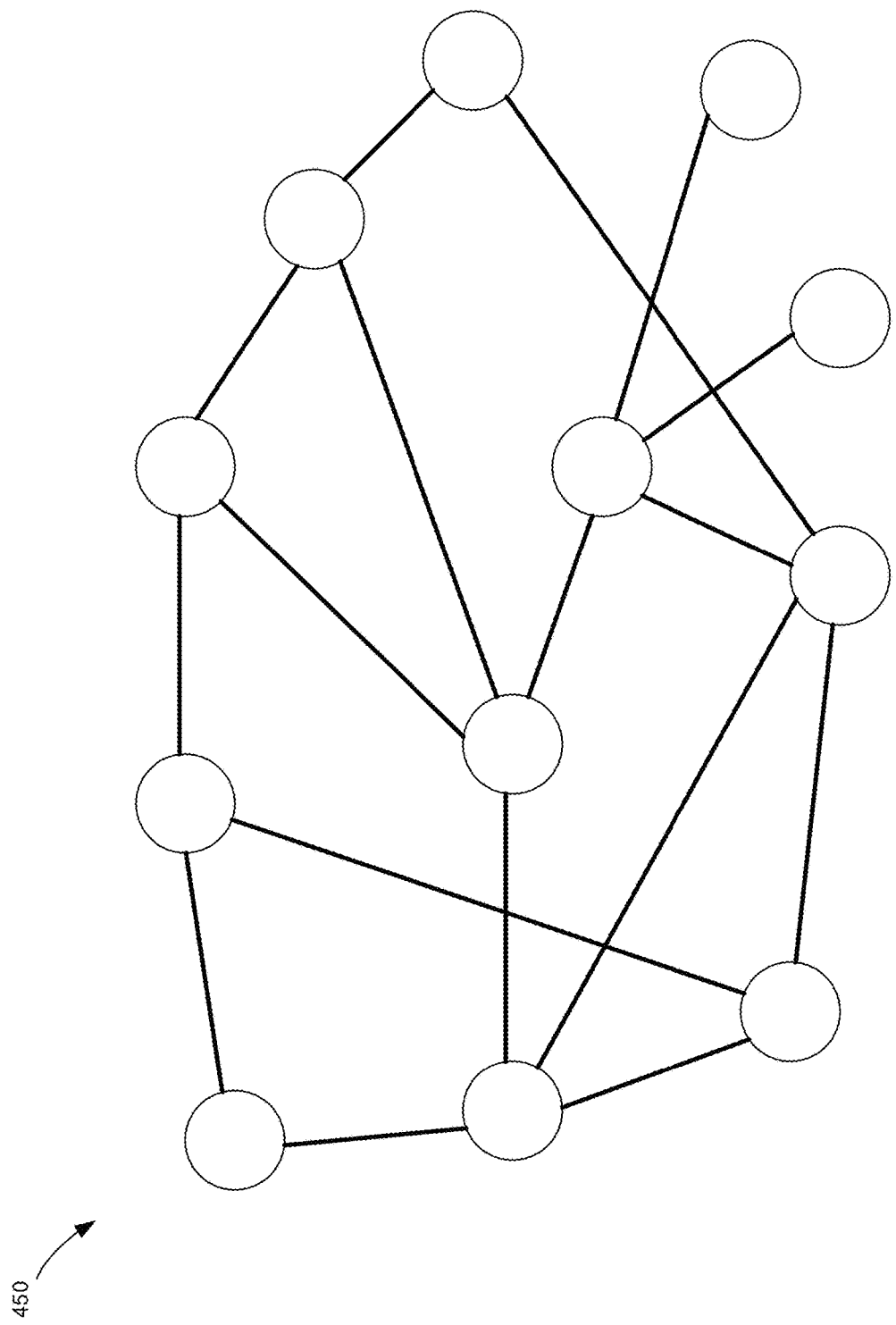
FIG. 4B illustrates an example network graph after graph analysis according to aspects of the disclosure.

FIG. 4B illustrates a graphical representation of allowable connections wherein edges between two groups of nodes have been replaced with a single edge, graph 450. Each edge in FIG. 4B is related to a generated firewall rule, as further explained below.

Figure 5:
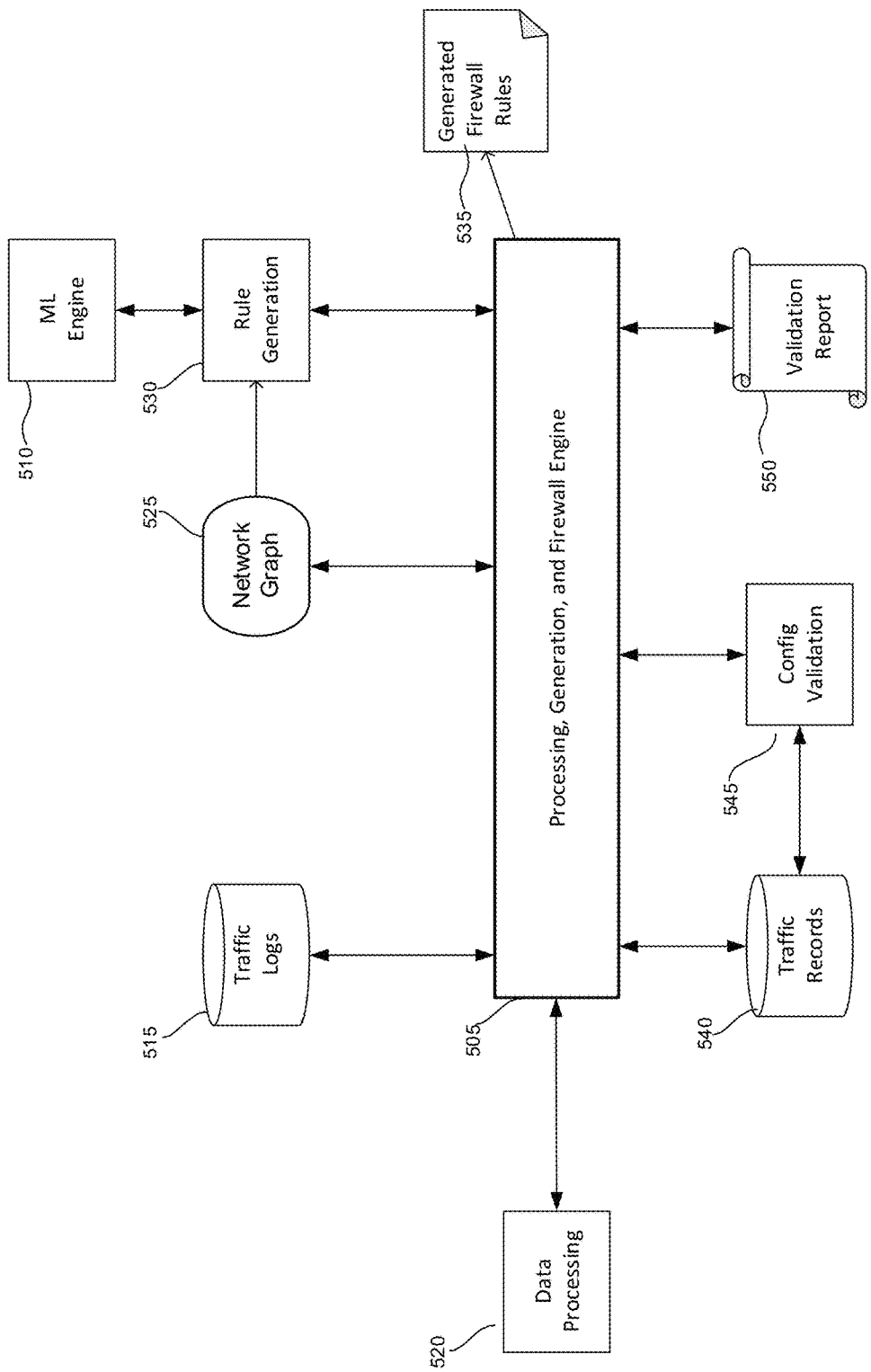
FIG. 5 is an example schematic system architecture according to aspects of the disclosure.

FIG. 5 illustrates an example architecture 500 and example processing flow related to the disclosed technology. FIG. 5 illustrates a processing, generation, and firewall engine 505 machine learning engine 510, traffic logs 515, a data processing module 520, a network graph 525, a rule generation module 530, firewall rules 535, traffic records 540, configuration validation engine 545, and a validation report 550. A person of skill in the art should understand that the names used and descriptions used with respect to architecture 500 are only examples, and other architectures, names, and combinations of modules and engines are possible.

Traffic logs 515 can be stored on computer system 110, within network 200, or cloud 201. As one examples, traffic logs 515 can include a plurality of logs which can include information relating to the direction of traffic, the source machine or virtual machine, target virtual machine or machine, or source port, internet or communication protocol used, destination port, and time of request, time request approved or denied, type of data requested, and the amount of data.

Data processing module 520 can contain software to read, parse, interpret, and extract information from traffic logs 515. In some examples, data processing module 520 can also combine information extracted from certain traffic logs based on a database of rules. As one example, data processing module 520 can combine logs which are sequential or within a certain amount of time within one another, such as within a fixed number of seconds or minutes, into a same record of processed data. In other examples, traffic records can be sampled to reduce log volume, simplify analysis, or remove duplicate traffic records. In other examples, data processing module can update a prior processed result with new traffic records or update processed data based on records obtained on a periodic basis, such as a weekly, monthly, or daily basis. In other examples, data processing module can generate comparative information related to the traffic logs, such as the amount of data within a certain time frame, amount of data in a particular time frame, or amount of data from one node to another node. In some examples, sampling of traffic log data can be based on this comparative information.

Data processing module 520 can also generate traffic records 540. Traffic records 540 can be related to traffic logs 515 and can be generated by removing duplicates, filtering data, or otherwise processing the data in traffic logs 515.

Network graph 525 can be generated from data obtained from processing by data processing module 520. In some examples, network graph 525 can be generated using one or more graph generation modules. In other examples, network graph 525 can be represented schematically within a volatile or non-volatile memory as binary code in equivalent mathematical representations of a graph, such as graph theoretical data structures. Network graph 525. Other non-limiting examples of network graph 525 include differences between graphs, graphs generated as a time series of time intervals, such as weeks or months.

Rule generation module 530 can process or interpret a network graph 525 or related data to generate a set of firewall rules, such as firewall rules 535, representing or equivalent to network graph 525. In some examples, rule generation module 530 can work in conjunction with machine learning (ML) engine 510.

ML engine 510 can contain machine learning related models and software modules. ML engine 510 can contain grouping or graph analysis algorithms, such as Role Extraction, Community Detection, Centrality Measurement, and Connected Components.

Firewall rules 535 can represent a set of rules generated from rule generation module 520 or ML engine 510. Firewall rules 535 can be optimized for a particular criteria, such as the number of rules, complexity, priority to certain machines or ports, processing time or complexity, or latency within a network.

Configuration validation engine 545 can be used to information related to the generated firewall rules by processing traffic and comparing the generated traffic logs against historical traffic logs. In some examples, configuration validation engine 545 can work in parallel with or in conjunction with processing, generation, and firewall engine 505. In some examples, configuration validation engine 545 can use two sets of firewall rules, such as the original firewalls associated with a cloud environment and a generated set of firewall rules, such as firewall rules 535, and "run" traffic records using both sets of rules. A first response can be generated using the original firewall rules and a second response can be generated using the second set of firewall rules. In some examples, the first response and the second response can contain information about which connections to and from virtual machines within a cloud environment were permitted or denied. The first response and the second response can be compared as part of the validation result.

Validation report 550 can contain summary information or other information related to thee generated firewall rules for presentation to an end user or for storage within a computing device. An example validation report can take the form as follows:

| Traffic flow | Original | Modified |
|---|---|---|
| Src: VM1 Port 190<br>Dst: VM2 Port 190<br>Protocol: TCP | Rule1 (allow) | Rule3 (deny) |
| Src: VM1 Port 200<br>Dst: VM2 Port 200<br>Protocol: TCP | Rule1 (allow) | Rule3 (deny) |
| Src: VM1 Port 210<br>Dst: VM2 Port 210<br>Protocol: TCP | Rule2 (Deny) | Rule3 (deny) |

Example Methods

Figure 6:
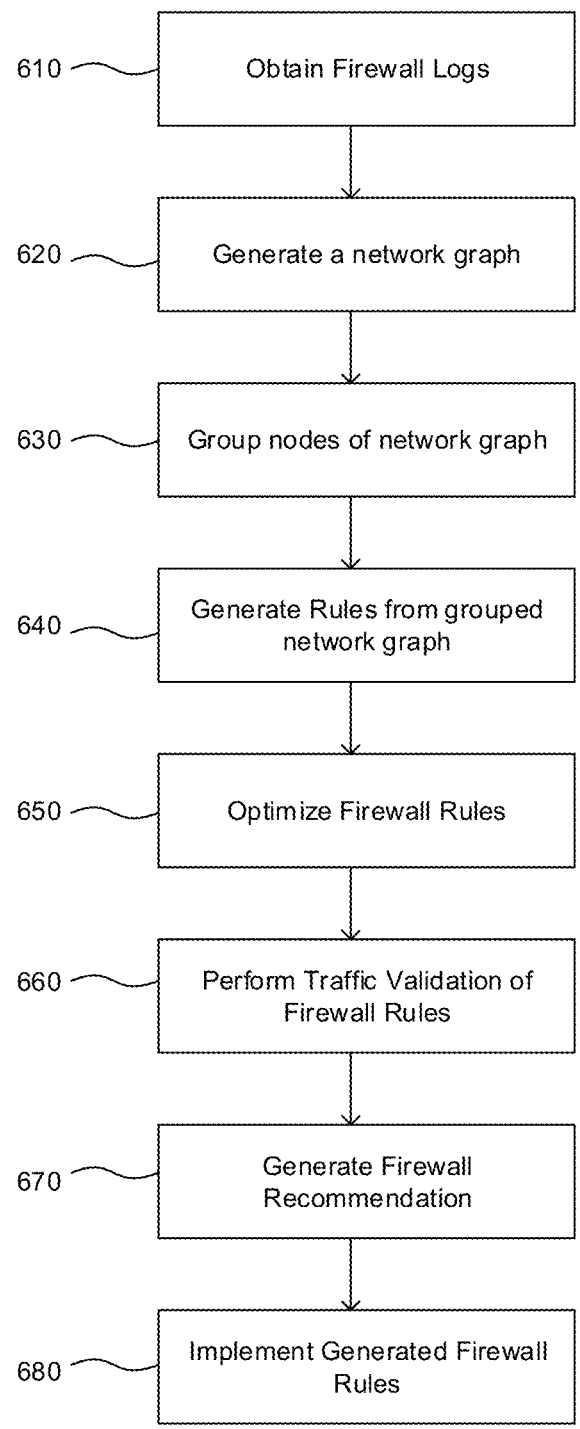
FIG. 6 illustrates an example method according to aspects of the disclosure.

FIG. 6 illustrates an example method 600. Method 600 can be used to generate a set of firewall rules which can be stored and implemented within a cloud environment. In some examples, method 600 can be performed automatically at predetermined intervals. In other examples, method 600 can be performed responsive to a user input or user command. In yet other examples, method 600 can be performed upon a predetermined event, such as an increase in virtual machines, an increase in requests to the cloud environment, or a threshold, such as a number of requests or percentage increase or decrease in the requests to a particular virtual machine being exceeded.

In some examples, certain clouds or virtual machines can have persistent rules associated with them. For example, certain virtual machines or cloud environments can be known to contain public information, which can always be accessed, and a firewall rule associated with such virtual machines or cloud environments can also be set to allow an incoming request. In other examples, certain virtual machines can only allow connections between other pre-identified machines.

In some examples, the set of generated firewall rules can be displayed to a user or network administrator to use, implement, modify, or otherwise interact with. In some examples, a network administrator can manually modify a subset of the firewall rules, or indicate additional intent related to the network, which can "force" a particular type of categorization or grouping of specific vertices.

In some examples, a number of groups or the grouping algorithm can be "tuned" or optimized for certain metrics, such as the number of firewall connections, the number of rules, or another user defined or test metric, which a user may define or test for. Depending on the grouping algorithm used, the grouping threshold allows customization by the user to meet their requirements. For example, a coarse group logic results in a smaller number of groups and thus generated firewall rules are also smaller in number and provide coarse-grained security. On the other hand, a fine-grained grouping results in a larger number of groups as well as firewall rules which closely mimic the underlying traffic pattern resulting in a tighter security profile.

At block 610, traffic logs can be obtained, such as traffic logs 515. Traffic logs, which can be historic logs, and can be related to one or more virtual machines on a cloud environment, can be obtained at this block. Traffic logs can have information such as that described herein. In some examples, firewall logs can be obtained instead of traffic logs, and can contain additional metadata. The traffic logs are received via data processing module 520, and may be pushed or pulled depending on network design.

At block 620, a graph can be generated based on obtained traffic logs. The generated graph can be equivalent to other mathematical representations. Additional blocks can be performed at block 620, such as those described with respect to FIG. 7.

At block 630, a network graph can be grouped. At this block, various nodes or vertices of a network graph can be grouped together. Additional blocks can be performed at block 630, such as those described with respect to FIG. 8.

At block 640, rules can be generated from the network graph. Additional blocks can be performed at block 640, such as those described with respect to FIG. 9.

At block 650, firewall rules can be optimized. In some examples, firewall optimization can occur based on two virtual machines containing a common identifier, such as for example, being identified as being within the same group. In some examples, the firewall rules can be saved as a file for implementation within an output file.

At block 660, traffic validation can occur. At this block, additional, two sets of firewall rules, such as the original firewalls associated with a cloud environment and a generated set of firewall rules or optimized set of firewall rules, such as firewall rules 535, can be analyzed. Both sets of rules can be used against synthetic traffic or historical traffic logs. A first response and a second response can be generated at this step. The first response and the second response can correspond to firewall responses generated by using generated firewall rules and synthetic firewall rules. In some examples, a "confusion matrix" such as that illustrated in FIG. 10 can be generated or used as part of traffic validation. A confusion matrix, also known as an error matrix, is a specific table layout that allows visualization of the performance of a machine learning or grouping algorithm.

At block 670, firewall recommendations can be generated. At this block, firewall recommendations can also be displayed to a user or administrator of a firewall.

At block 680, generated firewall rules can be implemented. In some examples, the generated firewall rules can be implemented automatically. In other examples, the generated firewall rules can be implemented after receiving an affirmative response or request from a user or administrator. In yet other examples, the generated firewall rules can be compared against a core set of firewall rules, and be automatically implemented if the generated rules are at least as strict as the core set of firewall rules.

Figure 7:
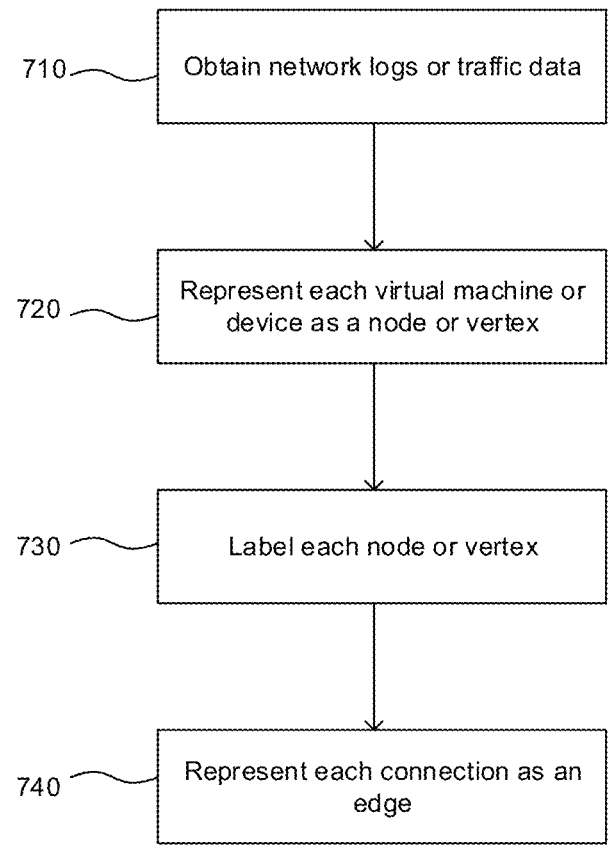
FIG. 7 is an example method which can be used to generate graphs according to aspects of the disclosure.

FIG. 7 illustrates method 700, which can be used for generation of graphs.

At block 710, network data or network logs can be obtained. Network data can contain data indicating the number of virtual machines, their identity, how long they have been instantiated, an IP address for the virtual machine, or another identifier. Network data can also include which connections or transmissions were allowed between two virtual machines, and whether that connection or transmission was internal to the cloud environment or between two cloud environments. In some examples, the network data can have been pre-processed to remove duplicate connections or transmissions between two sets of virtual machines. In other examples, the traffic volume can be normalized.

At block 720, each virtual machine can be identified as a node of a graph. In some examples, each virtual machine will form one node of a graph. In other examples, multiple nodes or vertices can correspond to a virtual machine, with each node of the multiple nodes corresponding to a particular set of metadata, such as a port of the virtual machine or a protocol used for communication.

At block 730, each node can be labeled or identified.

At block 740, each incoming or outgoing connection from a node, which would be reflected within the obtained network logs or network data, can be represented as an edge between two vertices or nodes of the graph. In some examples, the edges can be directed. In other examples, an edge can be bidirectional. In yet other examples, each edge can be undirected.

Figure 8:
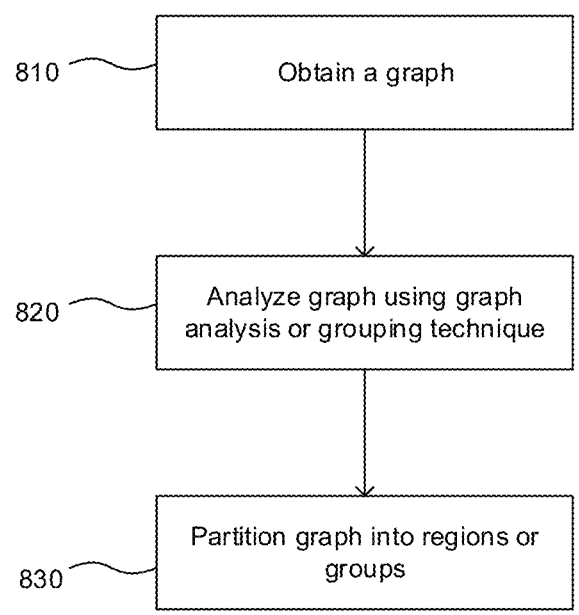
FIG. 8 is an example method which can be used for graph analysis according to aspects of the disclosure.

FIG. 8 illustrates method 800, which can be used for instance grouping. Although exemplary methods are discussed with reference to FIG. 8 for grouping, a person of skill in the art will understand that other methods and techniques can be used to group or associate vertices of a graph, including but not limited to machine learning techniques, generative adversarial networks, gaussian techniques, density techniques, binary techniques, bayes classifiers, binary forests, random forests, neural networks, neural nets, nearest neighbor techniques, and boosted trees.

At block 810, a graph, representing historical information can be received. The received graph can be similar to graph 300 illustrated above.

At block 820, the graph can be analyzed using an graph analysis algorithm or a grouping technique, which can include using machine learning or deep learning techniques. A person of skill in the art will recognize that the methods described are exemplary, and can be used in conjunction with one another, in various combinations, or otherwise tuned or modified. At this block, the method can lead to grouping elements of the graph into a number of groups.

In some examples, community detection algorithms can be used. In some examples, a minimum-cut method can be used. In other examples, the number of "minimum cuts" can be varied based on desired characteristics of the ending graph, such as the number of firewall rules desired. In some examples, hierarchical methods can be used. Other community methods which can be used without limitation include the Girvan-Newman algorithm, modularity maximization methods, statistical inference methods, or clique based methods. Modularity maximization methods can be chosen or selected based on the computational complexity of the log data, sensitivity of information in the underlying nodes, or other methods. Statistical inference methods can include generative models. Clique-based methods can be used with cliques of a fixed size or a varying size.

In other examples, centrality measure based algorithms can be used. In some examples, centrality measurements between the nodes can be used as features or inputs to a machine learning model. Other measures can also be used. As one example, "betweenness centrality" can be used. In other examples, "degree centrality" can be used. Nodes can be classified into groups, which can form the basis of a new graph, based on centrality measure based algorithms. In some examples, connected components methods, including connected component labeling, region labeling, or region extraction can be used in which groups of nodes can be uniquely labeled based on a provided heuristic.

In other examples, other machine learning based classification methods can be used to classify nodes into groups.

In some examples, one or more of the following techniques can be used. In some examples, probabilistic methods can be used. For example, a gaussian mixture model can be used. Gaussian mixture models are a probabilistic model for representing normally distributed subpopulations within an overall population. In a Gaussian mixture model, it is not required that an observed set of data should characterize or state which subpopulation a particular observation within the distribution belongs to.

Example machine learning techniques which can be used include the following. In some examples, a mix of supervised learning techniques and unsupervised learning techniques can be used. In some examples, generative adversarial networks can be used to predict or detect network anomalies. Generative adversarial networks use two networks, one adversarial and one generative, in an attempt to fool the adversarial network by objects generated by the generative network. In some examples, graph analysis methods can be used to group inputs, network parameters, trained models, or virtual machines. Graph analysis or grouping methods can be used in real time to classify and match models or groups of models with virtual machines or groups of virtual machines. Some other examples of techniques include dimensionality reduction. Dimensionality reduction can be used to remove the amount of information which is least impactful or statistically least significant. In networks, where a large amount of data is generated, and many types of data can be observed, dimensionality reduction can be used in conjunction with any of the techniques described herein. One example dimensionality reduction method is principle component analysis (PCA). PCA can be used to reduce the dimensions or number of variables of a "space" by finding new vectors which can maximize the linear variation of the data. PCA allows the amount of information lost to also be observed and for adjustments in the new vectors chosen to be made. Another example technique is t-Stochastic Neighbor Embedding (t-SNE). Ensemble methods can be used, which primarily use the idea of combining several predictive models, which can be supervised ML or unsupervised ML to get higher quality predictions than each of the models could provide on their own. As one example, random forest algorithms Neural networks and deep learning techniques can also be used for the techniques described above. Neural networks generally attempt to replicate the behavior of biological brains in turning connections between an input and output "on" or "off" in an attempt to maximize a chosen objective.

At block 830, upon assignment of each group, a graph can be partitioned into groups based upon the generated groups. Mathematically, a partition of a graph is the reduction or transformation of a graph to a new or smaller graph by partitioning the nodes of the original graph into mutually exclusive groups. Edges of the original graph that cross between the groups will produce edges in the partitioned graph.

Figure 9:
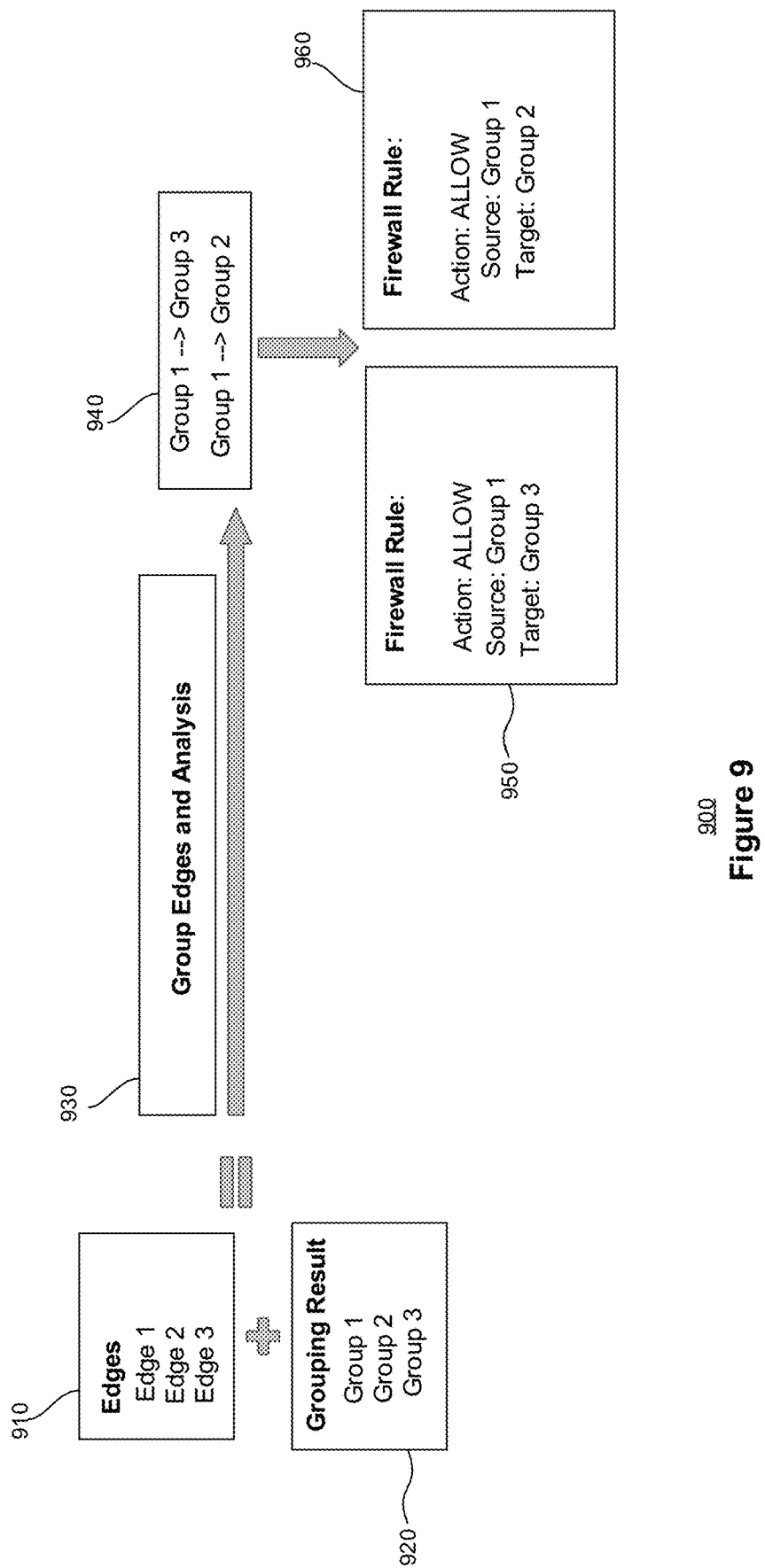
FIG. 9 is an example method which can be used to generate firewall rules according to aspects of the disclosure.

FIG. 9 illustrates aspects of method 900, which can be used for rule generation. As illustrated in method 900, a set of edges from a graph, such as set 910 can be combined with a set of grouping or graph analysis results, such as set 920, to transform or map the set of edges into a set of group with edges, such as through grouping edges and analysis in block 930. For example, duplicative edges can be removed during 930 to generate a set of information 940. 940 can include information about a new graph which is generated. The information from set 940 can be used to generate firewall rules, such as rule 950 and rule 960. Rule 950 can correspond to "Group 1→Group 3" in set 940 and rule 960 can correspond to "Group 1→Group 2" in set 940. As can be seen from FIG. 9, the results of grouping or graph analysis will in turn change the transformation from set 910 and set 920 into set 940, and thus affect the number and information contained within generated firewall rules. Deny firewall rules can be generated by default between two groups or elements of a graph when an "allow" rule is not generated for that set. In some examples, the "deny" rules can thus be the complement of the "allow" rules in the graph. In some other examples "deny" rules can be generated through other machine learning algorithms.

Although FIG. 9 is illustrated with respect to virtual machines (VMs), it is to be understood that other network tags can be used in lieu of VMs, such as an external IP address. Similarly, a group or unit can exist for a set of external IP addresses, such as based on the characteristics of the IP address. For example, a portion of the IP address can refer to the "network part" of the IP address while a portion of the IP address can refer to the "host" part of the IP address. As an example group mapping, all addresses with the same "network" part can be considered to be in one group. In other examples, addresses with the same "network" and "host" part can be used collectively but groups differentiated based on metadata.

In some examples, the generated firewall rules can be tested against historical traffic logs by replaying that data as well as against synthesized traffic data. It is expected that generated firewall rules will "match" with historic traffic logs in that the generated firewall rules will deny all traffic which was earlier denied and allow all traffic which was earlier denied. Similarly, it is expected that for synthetic data, the generated firewall rules will deny all data which the original firewall rules would have denied. This information can be visualized in the following table.

| Behavior of Original Firewall Rule ↓ | Allow or Deny with Historic Data | Behavior of Generated Firewall Rules → Allow | Deny |
|---|---|---|---|
| | Allow | Ideal | Not Acceptable |
| | Deny | Not Acceptable | Ideal |

| Behavior of Original Firewall Rule ↓ | Allow or Deny with Synthetic Data | Behavior of Generated Firewall Rules → Allow | Deny |
|---|---|---|---|
| | Allow | Not Ideal, but Acceptable | Ideal |
| | Deny | Not Acceptable | Ideal |

In the table above, each piece of synthetic data would fall into one of the four quadrants. In some examples, it may be known or configured as to which results are expected for a particular synthetic data log being replayed against both the original firewall rule and the generated firewall rule.

In the tables above, the generated firewall rules can be classified according to the desirability of the rules. "Ideal" can represent a situation which is expected or required, while "not acceptable" can represent a result or firewall rule behavior for a particular piece of synthetic data which indicates that the generated firewall rules lack important or critical features or display unexpected behavior.

Similarly, in the above table, a number of rules may fall into the "not ideal, but acceptable" category where the behavior of the generated firewall is still acceptable but not ideal as tighter security would have led to that particular synthetic data to be denied. "Ideal" can indicate behavior which represents a tighter security of the generated firewall rules. In some examples, the number of data points can be divided into the quadrants described above and the firewall rules and associated algorithms can be "tuned" to lead to a greater or lesser number of "not ideal, but acceptable" results.

Although the above classifications are exemplary, a person of skill in the art will understand that additional variations and testing configurations of generated firewall rules are possible, including larger tables or more granular testing are possible, and that additional parameters can be "tuned" for in the generated firewall rules.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Non-limiting aspects of the disclosed technology can include the following features:

1. A method to generate firewall rules, the method comprising:
    receiving data traffic flow information associated with computing devices connected over a network;
    generating, from the received data traffic flow information, a network graph with nodes and edges;
    grouping nodes of the network graph to generate a new graph;
    generating, from the new graph, a set of firewall rules; and
    outputting the set of firewall rules as an output file.
2. The method of claim 1, wherein grouping occurs through a machine learning algorithm.
3. The method of claim 1-2, comprising automatically provisioning network equipment associated with another network implemented to correspond to the network graph and to communicate based on the set of firewall rules.
4. The method of claim 1-3, wherein grouping occurs without a priori knowledge of the traffic data.
5. The method of claim 1-3, wherein the nodes are grouped into groups, and each group is a node of a new graph.
6. The method of claim 5, wherein grouping occurs based on iterative grouping.
7. The method of claim 1-3, comprising varying a parameter associated with a grouping algorithm to minimize the set of firewall rules.
8. The method of claim 1-3, comprising validating the set of firewall rules based on historical traffic data and a set of original firewall rules.
9. The method of claim 1-3, comprising validating the set of firewall rules based on synthetic traffic data and a set of original firewall rules.
10. The method of claim 7-8, comprising generating a validation report summarizing metrics related to the generated firewall rules.
11. The method of claim 1-8, comprising implementing the set of firewall rules automatically after validation.
12. The method of claim 1-8, comprising loading the firewall rules into a firewall component and using the firewall component to control network traffic through the firewall component or the network.
13. The method of claims 1-12 wherein the machine learning method used for grouping is one of: (i) community detection algorithm, (ii) a centrality measure based algorithm, (iii) a visual machine learning method, (iv) a wherein clique-based methods, (v) a pagerank algorithm, (vi) an generative adversarial networks, (vii) a machine learning classification algorithm.
14. A system comprising:
    one or more processing devices coupled to a memory containing instructions, the instructions causing the one or more processing devices to:
    receive data traffic flow information associated with computing devices connected over a network;
    generate, from the received data traffic flow information, a network graph with nodes and edges;
    group nodes of the network graph to generate a new graph;
    generate, from the new graph, a set of firewall rules; and output the set of firewall rules as an output file.
15. The system of claim 14 wherein grouping occurs through a machine learning algorithm.
16. The system of claim 14-15 comprising instructions causing the one or more processing devices to automatically provision network equipment associated with another network implemented to correspond to the network graph to communicate based on the set of firewall rules.
17. The system of claims 14-16 wherein grouping occurs without a priori knowledge of the traffic data.
18. The system of claims 14-16 wherein the nodes are grouped into groups, and each group is a node of a new graph.
19. The system of claims 14-18 comprising instructions causing the one or more processing devices to vary a parameter associated with a grouping algorithm to minimize the set of firewall rules.
20. The system of claims 14-19 comprising instructions causing the one or more processing devices to validate the set of firewall rules based on historical traffic data and a set of original firewall rules.
21. The system of claims 14-19 comprising instructions causing the one or more processing devices to validate the set of firewall rules based on synthetic traffic data and a set of original firewall rules.

22. The system of claims 14-19 comprising instructions causing the one or more processing devices to generate a validation report summarizing metrics related to the generated firewall rules.

23. The system of claims 14-19 comprising instructions causing the one or more processing devices to implement the set of firewall rules automatically after validation.

24. The system of claims 14-19 comprising instructions causing the one or more processing devices to load the firewall rules into a firewall component and using the firewall component to control network traffic through the firewall component or the network.

The invention claimed is:

1. A method to generate firewall rules, the method comprising:
   receiving data traffic flow information associated with a set of virtual machines connected over a network;
   generating from the received data traffic flow information, a network graph with nodes and edges;
   grouping nodes of the network graph to generate a new graph;
   generating, from the new graph, a set of firewall rules based on a common identifier between two or more virtual machines from the set of virtual machines;
   validating the set of firewall rules by comparing first traffic records generated using the set of firewall rules with second traffic records generated using a second set of firewall rules; and
   outputting the set of firewall rules as an output file.

2. The method of claim 1, wherein grouping occurs through a machine learning algorithm.

3. The method of claim 1, comprising automatically provisioning network equipment associated with another network implemented to correspond to the network graph and to communicate based on the set of firewall rules.

4. The method of claim 1, wherein grouping occurs without a priori knowledge of the traffic data.

5. The method of claim 1, wherein the nodes are grouped into groups, and each group is a node of a new graph.

6. The method of claim 5, wherein grouping occurs based on iterative grouping.

7. The method of claim 5, comprising varying a parameter associated with a grouping algorithm to minimize the set of firewall rules.

8. The method of claim 1, wherein validating further comprises validating the set of firewall rules based on historical traffic data and a set of original firewall rules.

9. The method of claim 1, wherein validating further comprises validating the set of firewall rules based on synthetic traffic data and the second set of firewall rules, wherein the second set of firewall rules comprise a set of original firewall rules.

10. The method of claim 7, comprising generating a validation report summarizing metrics related to the generated firewall rules.

11. The method of claim 1, comprising implementing the set of firewall rules automatically after validation.

12. The method of claim 11, comprising loading the firewall rules into a firewall component and using the firewall component to control network traffic through the firewall component or the network.

13. The method of claim 2 wherein the machine learning method used for grouping is one of: (i) community detection algorithm, (ii) a centrality measure based algorithm, (iii) a visual machine learning method, (iv) clique-based methods, (v) a pagerank algorithm, (vi) an generative adversarial networks, (vii) a machine learning classification algorithm.

14. A system comprising:
    one or more processing devices coupled to a memory containing instructions, the instructions causing the one or more processing devices to:
      receive data traffic flow information associated with virtual machines connected over a network;
      generate from the received data traffic flow information, a network graph with nodes and edges;
      group nodes of the network graph to generate a new graph;
      generate from the new graph, a set of firewall rules based on a common identifier between two or more virtual machines from the set of virtual machines;
      validate the set of firewall rules by comparing first traffic records generated using the set of firewall rules with second traffic records generated using a second set of firewall rules; and
      output the set of firewall rules as an output file.

15. The system of claim 14 wherein grouping occurs through a machine learning algorithm.

16. The system of claim 15 wherein the machine learning method used for grouping is one of: (i) community detection algorithm, (ii) a centrality measure based algorithm, (iii) a visual machine learning method, (iv) clique-based methods, (v) a pagerank algorithm, (vi) an generative adversarial networks, (vii) a machine learning classification algorithm.

17. The system of claim 14 comprising instructions causing the one or more processing devices to automatically provision network equipment associated with another network implemented to correspond to the network graph to communicate based on the set of firewall rules.

18. The system of claim 14 wherein the nodes are grouped into groups, and each group is a node of a new graph.

19. The system of claim 14 comprising instructions causing the one or more processing devices to vary a parameter associated with a grouping algorithm to minimize the set of firewall rules.

20. The system of claim 14 comprising instructions causing the one or more processing devices to implement the set of firewall rules automatically after validation.

* * * * *